(12) United States Patent
Thale et al.

(10) Patent No.: US 12,332,211 B2
(45) Date of Patent: Jun. 17, 2025

(54) METHOD FOR DETERMINING A MATERIALS CHARACTERISTIC VALUE OF MAGNETIZABLE METAL BODIES BY MEANS OF A MICROMAGNETIC SENSOR ASSEMBLY, AND CORRESPONDING SENSOR ASSEMBLY

(71) Applicant: ROSEN SWISS AG, Stans (CH)

(72) Inventors: Werner Thale, Wallenhorst (DE); Sebastian Hühn, Lingen (DE)

(73) Assignee: ROSEN 2 Holding AG, Stans (CH)

( * ) Notice: Subject to any disclaimer, the term of this patent is extended or adjusted under 35 U.S.C. 154(b) by 41 days.

(21) Appl. No.: 17/757,171

(22) PCT Filed: Dec. 8, 2020

(86) PCT No.: PCT/EP2020/085093
§ 371 (c)(1),
(2) Date: Jun. 10, 2022

(87) PCT Pub. No.: WO2021/116109
PCT Pub. Date: Jun. 17, 2021

(65) Prior Publication Data
US 2023/0018264 A1      Jan. 19, 2023

(30) Foreign Application Priority Data

Dec. 10, 2019    (DE) .................... 102019133799.2

(51) Int. Cl.
    *G01N 27/72*    (2006.01)
(52) U.S. Cl.
    CPC ................ *G01N 27/725* (2013.01)
(58) Field of Classification Search
    CPC .................................... G01N 27/725
    See application file for complete search history.

(56) References Cited

U.S. PATENT DOCUMENTS 5,028,869 A      7/1991   Gerd et al.
5,992,241 A  *  11/1999   Posgay ................ G01N 27/725
                                                      73/779

(Continued)

FOREIGN PATENT DOCUMENTS

CN          104316594 A       1/2015
DE            3511076 A1     10/1986

OTHER PUBLICATIONS

Luo et al. "Non-destructive hardness measurement of hot-stamped high strength steel sheets based on magnetic Barkhausen noise" Procedia Engineering 81, 1768-1773, Elsevier (Year: 2014).*

(Continued)

*Primary Examiner* — Akm Zakaria
(74) *Attorney, Agent, or Firm* — Husch Blackwell LLP (57) ABSTRACT

A method is provided for determining at least one material characteristic of a magnetizable metal body by means of a micromagnetic sensor arrangement, which comprises at least one excitation coil having a magnetic core for signal excitation and at least one receiver. The body is magnetized by the sensor arrangement via current or voltage excitation of the sensor arrangement, which comprises at least one sign change between a positive part of a half-wave and a negative part of a half-wave. At least one signal is measured in the receiver, and the signal is Fourier transformed. The material characteristic are determined from at least one Fourier component. The excitation is turned off, and the post-oscillation of the signal is measured in the receiver. At least the part of the signal resulting from the post-oscillation in the Fourier transformation is used.

19 Claims, 10 Drawing Sheets

(56) References Cited

U.S. PATENT DOCUMENTS

| | | | |
|---|---|---|---|
| 2002/0196016 A1 | 12/2002 | Mitra et al. | |
| 2005/0242803 A1 | 11/2005 | Nummila et al. | |
| 2007/0188172 A1* | 8/2007 | Garwood | G01R 33/446 324/307 |
| 2015/0115956 A1* | 4/2015 | Ackerman | G01R 33/4826 324/309 |
| 2017/0168016 A1* | 6/2017 | Hardy | G01N 27/82 |

OTHER PUBLICATIONS

Luo Xiaoyu et al: "Non-destructive Hardness Measurement of Hot-stamped High Strength Steel Sheets based on Magnetic Barkhausen Noise", Procedia Engineering, Elsevier BV, NL, bd. 81, Oct. 15, 2014, Sieten 1768-1773, XP029078427, ISSN: 1877-7058, DOI: 10.1016/J.PROENG.2014.10.229.

L R Padovese et al: "A fast Mellin and Scale transform", Proceedings of the Institution of Mechanical Engineers, Part G: Journal of Aerospace Engineering, Bd. 2007, Nr. 5, Apr. 30, 2009, Seiten 9-588, XP055338241, ISSN: 0954-4100, DOI: 10.1243/09544100JAERO436.

Javier Garcia-Martin et al: "Non-destructive techniques based on eddy current testing", Sensors, bd. 11, Nr. 3, Feb. 28, 2011 (Feb. 28, 2011), Seiten 2525-2565, XP002718104, ISSN: 1424-8220, DOI: 10.3390/S110302525.

Mathias Stolzenberg et al: "Special: Mess-und Pruftechnik", Jan. 1, 2012 (Jan. 1, 2012), XP055158303, URL:http://www.emg-automation.com/fileadmin/files/2012_07_SP_Materialcharakterisierung-an-Flachprodukten.pdf.

International Search Report for Ser. No. PCT/EP2020/085093 issued Mar. 25, 2021.

He, Yunze [et al.]: Reduction on Lift-Off Effects in Pulsed Eddy Current for De-fect Classification. In: IEEE Transactions ofMagnetics, Vo. 47, 2011, No. 12,pp. 4753-4760.

* cited by examiner

METHOD FOR DETERMINING A MATERIALS CHARACTERISTIC VALUE OF MAGNETIZABLE METAL BODIES BY MEANS OF A MICROMAGNETIC SENSOR ASSEMBLY, AND CORRESPONDING SENSOR ASSEMBLY

CROSS REFERENCE

This application claims priority to PCT Application No. PCT/EP2020/085093, filed Dec. 8, 2020, which itself claims priority to German Application No. 10 2019 133799.2, filed Dec. 10, 2019, the entireties of both of which are hereby incorporated by reference.

FIELD OF THE INVENTION

The invention relates to a method for determining at least one material characteristic of a magnetizable metal body, in particular of a pipeline, by means of a micromagnetic sensor arrangement. The invention furthermore relates to a micromagnetic sensor arrangement for carrying out the method and to an inspection pig for the in-line inspection of pipelines, which is equipped with a corresponding sensor arrangement.

BACKGROUND OF THE INVENTION

Micromagnetic sensor arrangements and their use in the scope of nondestructive material testing for the quality assurance of components made of magnetizable metal materials are known.

BRIEF SUMMARY OF THE INVENTION

It is an object of the present invention to provide a method which may be applied for use for the in-line inspection of pipelines and/or with which additional data that allow the improved determination of material characteristics, or the determination of material characteristics not hitherto determinable by means of micromagnetic examinations, may be recorded, and to provide an improved sensor arrangement for carrying out the method. It is an aim to provide a method for determining a material characteristic by means of a micromagnetic sensor arrangement for the in-line inspection of pipelines. To this extent, the invention also relates to an inspection pig for the in-line inspection of pipelines, which is equipped with a sensor arrangement according to the invention.

In a method for determining a material characteristic of a magnetizable metal body by means of a micromagnetic sensor arrangement, the body is magnetized by means of the sensor arrangement. For this purpose, current or voltage excitation of the sensor arrangement is carried out via at least one excitation coil for the signal excitation. The current or voltage excitation comprises at least one sign change between a positive part of a half-wave and a negative part of a half-wave. In this case, the positive part of the half-wave may follow the negative part, or vice versa. By the current or voltage excitation, a magnetic core of the excitation coil of the micromagnetic sensor arrangement generates a magnetic field, by which the body to be tested is magnetized. A magnetic field of a magnetic circuit comprising the sensor arrangement and the body, which varies as a function of time, is obtained. Because of the varying magnetic field of the magnetic circuit, a signal is obtained in the receiver, and is measured. Since the behavior of the overall magnetic circuit is substantially determined by the properties of the body, conclusions about the structure may be drawn from the signal, and conclusions about the at least one material characteristic of the body may be drawn therefrom. For this purpose, the signal is subjected to a Fourier transformation and the corresponding material characteristic is determined from the Fourier components. The method according to the invention is now based on the discovery that after the excitation of the sensor arrangement is turned off, a post-oscillation of the magnetic circuit and of the signal in the receiver due to the decaying magnetic field takes place. Additional information, which improves the quality of the method for determining a material characteristic, may be obtained from the decay of the signal, the post-oscillation after turning off. By the method according to the invention, the material characteristic may be determined in an improved way or material characteristics which cannot be determined with previous micromagnetic examinations may be determined.

Furthermore, turning the excitation off and on with an excitation frequency, in particular a constant excitation frequency, respectively leads to a broad frequency spectrum, the signals of which may be evaluated and used to determine material characteristics.

For carrying out the method, besides a micromagnetic sensor arrangement, it is necessary to provide means known in principle to the person skilled in the art for generating the current or voltage excitation with a particular, preferably selectable frequency, such as a function generator having a corresponding controller, corresponding means for recording the signal resulting in the receiver, such as an electronic measuring instrument and/or a measurement amplifier and a corresponding memory for the measurement data, as well as evaluation means for carrying out the Fourier transformation and/or determining the material characteristic, in which case these steps may for example be carried out by means of commercially available electronic data processing systems. A corresponding control unit furthermore needs to be provided.

In a magnetizable metal body, the magnetic moments of the atoms (elementary magnets) are aligned parallel in restricted domains. The direction of the magnetization is orientated with the crystal lattice of the material. These microscopically small magnetized regions are also referred to as Weiss domains. The boundaries between the domains are also referred to as Bloch walls. If such a material is exposed to an increasing magnetic field, the Bloch walls are initially displaced in favor of those Weiss domains which are aligned in the direction of the external magnetic field. Furthermore, the alignment of the magnetization inside a Weiss domain changes suddenly. This is also known as the Barkhausen effect. The displacement of the Bloch walls takes place discontinuously. This is the case, in particular, when nonmagnetized inclusions or dislocations in a crystal lattice locally constrain the Bloch walls. Under the effect of an external magnetic field, sudden release and dislocation of the Bloch wall may then take place. From the profile of the magnetization of the body, its microscopic structure, in particular the size of the crystals, as well as inclusions and defects inside the crystals may thus be deduced. These defects and inclusions also influence the mechanical properties of the body. From the signal which is obtained on the basis of the magnetic field of the body being examined, properties of the body may therefore be inferred.

Preferably, pulsed excitation of the micromagnetic sensor arrangement is carried out. The excitation pulse may in this case be carried out as a sinusoidal pulse or as a square-wave pulse. Hybrid shapes such as sawtooth pulses may also be envisioned. What is important is that in this case a positive and negative pulse, or partial pulse, follow one another directly, that is to say a sign change takes place. Whether a negative pulse follows a positive pulse or a positive pulse follows a negative pulse is not important in this case. The excitation pulse may comprise a few successive oscillations (<5 oscillations), after which the excitation is turned off and the post-oscillation is measured. By limiting the excitation to a short excitation pulse, the method may be carried out rapidly. Particularly preferably, the excitation is carried out by precisely one oscillation comprising positive and negative portions, and in particular a positive and a negative half-wave, which follow one another directly. With a predetermined frequency of the excitation, more processes of turning on and off are therefore carried out per unit time. The measurement time is shortened and the method can be carried out more rapidly.

Preferably, the method comprises a test sequence having four successive steps in the order mentioned below:
a) magnetizing the body by a first excitation pulse;
b) turning off the excitation during a first dead time;
c) exciting the body by a second excitation pulse in a measurement sequence;
d) turning off the excitation during a second dead time, a measurement of the signal being carried out in the receiver of the sensor arrangement in the measurement sequence and in the second dead time.

By the magnetizing and the subsequent decay of the time-varying magnetic field or the signal in the receiver, influences of a possibly existing remanent magnetization of the body, which may interfere with the actual measurement, are reduced. This magnetizing is followed by the actual measurement cycle, comprising the measurement sequence in which excitation of the body is carried out by a second excitation pulse, subsequently turning off the excitation and a second dead time subsequent to the measurement sequence. During the measurement sequence and the second dead time, a measurement of the signal is carried out in the receiver of the sensor arrangement. The signal is fully or partially subjected to the Fourier transformation, and the material characteristic is determined from the Fourier components.

Preferably, the excitation is carried out with a magnetization frequency of between 500 and 5000 hertz, preferably between 800 and 1600 hertz. These magnetization frequencies are very high compared with the typically used magnetization frequencies of 50 hertz. The high magnetization frequencies make it possible to use the method according to the invention in the scope of in-line inspection methods. For in-line inspection methods, the sensor arrangement is moved relative to the body. The displacement between the sensor arrangement and the body during a measurement comprising a test sequence should in this case preferably be limited to 10% of the length of the sensor arrangement. Assuming a rate of advance of two meters per second, a length of the sensor arrangement of from 5 to 10 cm and a test sequence lasting four periods, the test sequence comprising the magnetizing, the first dead time, the measurement sequence and the second dead time, and the duration of the measurement sequence comprising a complete oscillation with zero crossing being provided for each of these periods of the test sequence, gives a minimum required magnetization frequency of 800 hertz. The required minimum magnetization frequency is therefore dependent on the overall size of the micromagnetic sensor arrangement and the rate of advance, with smaller sensor arrangements and higher rates of advance requiring higher magnetization frequencies.

Preferably, the micromagnetic sensor arrangement is moved relative to the body with a continuous rate of advance of at least 0.5 meters per second, preferably between 1 and 2 meters per second. With these rates of advance, the method is suitable for economical in-line inspection of pipes.

Preferably, the measurement of the signal is carried out by means of a reception coil having a magnetic core as the receiver. In this case, the signal represents the current or voltage signal induced in the reception coil by the variable magnetic field of the body, or of the magnetic circuit comprising the body and the sensor arrangement. Since the behavior of the magnetic circuit is substantially determined by the magnetic behavior of the body, the mechanical properties of the body may be deduced from the signal. In this way, measurement of the properties of the body averaged over the region of action of the sensor arrangement is possible. In a preferred embodiment, the sensor arrangement comprises a magnet yoke, which forms the magnetic cores of the excitation coil and of the reception coil. In this way, the magnetic flux in the magnetic circuit can be guided better. The signal quality of the sensor arrangement is improved. Such a sensor arrangement having a magnet yoke may be produced in a straightforward way.

As an alternative, the measurement of the signal is carried out by means of a magnetic field sensor, in particular a Hall element, as the receiver. With a magnetic field sensor, in particular a Hall element, as the receiver, the local magnetic field generated by the micromagnetic sensor arrangement can be measured. This affords the possibility of also detecting material inhomogeneities which have lengths and widths much smaller than the length and width of action of the sensor arrangement, with the aid of its stray fields. Further magnetic field sensors may also be provided as receivers, so that more measurement channels are available and, for example, lifting of the sensor arrangement from the test body can be detected.

It is also conceivable to use a sensor arrangement having a reception coil and one or more magnetic field sensor(s), for example Hall element(s), as receivers. In this case, a plurality of signals are generated and measured in the plurality of receivers by the magnetic field of the magnetic circuit. The further evaluation of the signals by Fourier transformation and determination of the material characteristic by at least one Fourier component may be carried out separately for some of these signals, separately for all the signals, together for some signals or together for all the signals.

Preferably, a correlation of the at least one material characteristic with the Fourier components is carried out with the aid of test bodies. The test bodies are measured by the method according to the invention as claimed in one of claims 1 and 7 and their Fourier components. At the same time, the material characteristics of the test bodies are known and/or they are determined by other measurement methods, optionally including by destructive material testing, before or after determining the Fourier components. By such a correlation of a material characteristic and Fourier components, the material characteristic may be determined quantitatively from the Fourier components.

Particularly preferably, the determination of the correlation is carried out by a machine learning method. This is particularly advantageous when the correlation between Fourier components and the material characteristic is not readily apparent. The use of machine learning methods therefore makes it possible to compile a correlation when there are complex relationships between Fourier components and the material characteristic respectively to be determined. The method may therefore be used particularly flexibly for the determination of different material characteristics.

Particularly preferably, the determination of the correlation is carried out according to the random forest method or by means of a support vector machine. These represent rapid and reliable machine learning methods, by which this correlation may be determined with little outlay.

Preferably, a mechanical-technological material characteristic is determined, for example the toughness, in particular the Charpy toughness, material inhomogeneities, for example local hardness increases, and/or material stresses, for example tensile stresses. Preferably, the determination of more than one material characteristic is also carried out in the method with one measurement. The method according to the invention may therefore be used for the determination of different material characteristics. The characteristics mentioned by way of example, such as Charpy toughness, axial stresses and local hardness increases are, for example, relevant when using the method in the scope of in-line inspections of pipelines. The method is not, however, restricted to these characteristics or use in the scope of in-line inspections of pipelines.

The object of the invention is furthermore achieved by a micromagnetic sensor arrangement for carrying out the method as claimed in one of claims 1 to 11. The sensor arrangement comprises at least one excitation coil for the signal excitation and at least one receiver. According to the invention, the magnetic core of the excitation coil of the sensor arrangement is made from a nanocrystalline material having a high magnetic permeability. The high-permeability magnetic core material in this case still ensures a relatively high magnetic flux even at frequencies in the kHz range. Nanocrystalline materials comprise crystallites having grain dimensions typically in the range of 10-15 nm, the crystallites being separated by amorphous boundary layers with a thickness of a few atomic layers. The materials typically have a thickness of from 20 to 40 µm. A magnetic core made of nanocrystalline material is constructed from a multiplicity of thin layers.

A sensor arrangement having a magnetic core with a high permeability makes it possible that the behavior of the overall magnetic circuit, consisting of the sensor arrangement and the body to be tested, and therefore the hysteresis curve, is still substantially determined by the body to be tested even at high magnetization frequencies. In this case, a material having a $\mu_r$ of between 15 000 and 150 000 has a high magnetic permeability.

In order to operate the micromagnetic sensor arrangement according to the invention, means known in principle to the person skilled in the art for generating the current or voltage excitation with a particular, preferably selectable frequency, such as a function generator having a corresponding controller, corresponding means for recording the signal resulting in the receiver, such as an electronic measuring instrument and/or a measurement amplifier and a corresponding memory for the measurement data, as well as evaluation means for carrying out the Fourier transformation and/or determining the material characteristic need to be provided, in which case these steps may for example be carried out by means of commercially available electronic data processing systems. A corresponding control unit furthermore needs to be provided.

Preferably, the receiver is formed by a reception coil having a magnetic core. A current and/or voltage signal is induced therein by the time-varying magnetic field. In this way, a particularly robust sensor arrangement is achieved. In one preferred embodiment, the sensor arrangement comprises a magnet yoke which forms the magnetic cores of the excitation coil and of the reception coil.

As an alternative or in addition, the receiver is formed by a magnetic field sensor, in particular a Hall element. The magnetic field sensor makes it possible to measure the local magnetic field generated by the sensor arrangement but substantially determined by the magnetic properties of the body to be tested. This affords the possibility of also detecting material inhomogeneities which have lengths and widths much smaller than the length and width of action of the sensor arrangement, with the aid of its stray fields.

In one particularly preferred embodiment, the sensor arrangement comprises a magnet yoke forming at least the magnetic core of the excitation coil and three magnetic field sensors, of which one is arranged on each of the yoke ends and one is arranged between the yoke ends on a side of the yoke crosspiece facing toward the body to be examined. The magnetic field sensors arranged on the yoke ends are primarily used to determine lifting of the sensor from the body. The magnetic field sensor arranged between the yoke ends is primarily used to measure a local magnetic field as described above. Furthermore, the magnetic field sensors provide additional measurement channels of the sensor arrangement. The magnetic field sensors may in this case, for example, be configured as a Hall element.

Preferably, the sensor arrangement also comprises a temperature sensor. This is particularly important when using a Hall element as a receiver, since the signal of a Hall element is temperature-dependent. The material characteristic to be determined may also be temperature-dependent, however, so that knowledge of the temperature at which the material characteristic has been determined is important for correct classification of the material characteristic.

Preferably, the sensor arrangement has a length of between 5 and 10 cm. A sensor arrangement having such dimensions is particularly suitable for in-line inspection, since on the one hand it is large enough not to be impeded by a lifting effect and, on the other hand, it is still suitable in terms of overall size and weight for in-line use.

An inspection pig for the in-line inspection of pipelines, having a sensor arrangement as claimed in one of claims 12 to 16, is also a subject of the invention. Preferably, such an inspection pig comprises from four to eight sensor arrangements, which are arranged over its circumference. Such an inspection pig therefore straightforwardly makes it possible to determine the material characteristic at particular points distributed over the circumference of the pipeline. A comprehensive picture of the material properties or the material state of the pipeline to be inspected may therefore be obtained. As an alternative, full coverage of the pipeline may be carried out by the inspection pig, for example if material inhomogeneities are intended to be registered and/or a longitudinal seam of the pipeline is intended to be examined. For full coverage, sensor arrangements are arranged in a plurality of measurement planes arranged behind one another in the axial direction, sensors in the individual measurement planes being offset with respect to one another in the circumferential direction in such a way that gaps existing between the sensor arrangements of one measurement plane are each covered by sensor arrangements of other measurement planes.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Parts that are the same or have a similar effect are, if expedient, provided with identical references. Individual technical features of the exemplary embodiments described below may be combined with the features of claim 1 and with the features of individual previously described exemplary embodiments to form subjects according to the invention.

Figure 1:
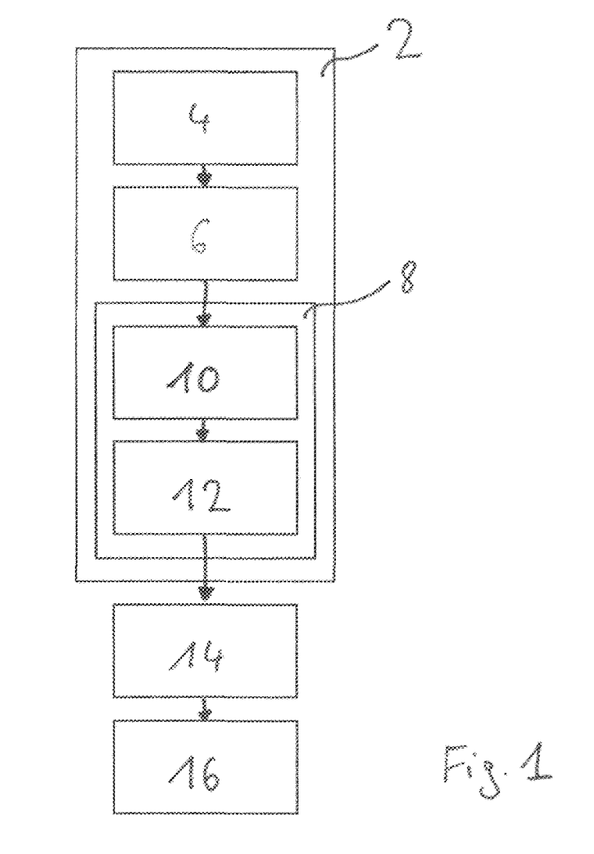
FIG. 1 shows a flowchart of the method according to the invention.

FIG. 1 shows an exemplary procedure of the method according to the invention for determining at least one material characteristic of a magnetizable metal body 26 by means of a micromagnetic sensor arrangement 18, which comprises at least one excitation coil 22 having a magnetic core and at least one receiver. The magnetic core of the excitation coil 22 is in this case formed by the magnet yoke 20. The at least one characteristic is determined locally on the body 26. In this case, the sensor arrangement 18 and the body 26 are preferably moved relative to one another. In a test sequence 2, magnetizing is initially carried out, during which an excitation signal is applied to the excitation coil 22 of the sensor arrangement 18. In this way, the magnet yoke 20 is magnetized and a magnetic field, by which the body 26 is magnetized, is generated. In the case of an excitation signal varying in the course of time, the magnetic field and therefore the magnetization of the body 26 are also time-varying. The magnetizing 4 is followed by a first dead time 6. During this, the varying magnetic field can die away in the magnetic circuit consisting of the sensor arrangement 18 and the body 26. In this way, possibly existing remanent magnetizations of the body 26, which could vitiate the actual measurement now taking place in the measurement cycle 8, are reduced. The actual measurement cycle 8 is subdivided into the measurement sequence 10 in which a magnetic field varying in the course of time is generated by an excitation pulse via the excitation coil 22 of the sensor arrangement 18. The excitation pulse comprises at least one sign change between a positive part of a half-wave and a negative part of a half-wave. In this way, a reversal of the magnetization takes place in the body. The variable magnetic field, which is determined by the magnetic circuit consisting of the sensor arrangement 18 and the body 26, generates a signal in the receiver, which is recorded. From this, the variation of the magnetization of the body 26 in the course of time can be deduced. This in turn allows conclusions about the material properties of the body 26. After the measurement sequence 10, the excitation is turned off. This is followed by a second dead time 12. During the second dead time 12, a post-oscillation of the signal in the receiver after turning off the excitation is measured. At least the part of the signal resulting from the post-oscillation is subjected to a Fourier transformation in step 14. Preferably, the signal during the measurement sequence 10 and the dead time 12, which together form the measurement cycle 8, is used in the Fourier transformation. With the aid of the Fourier components, the determination of the at least one material characteristic is then carried out in step 16.

In the following exemplary embodiments, the excitation pulse is in this case a sine pulse consisting of two half-waves with a zero crossing. Square-wave pulses or differently shaped pulses with a sign change may also be envisioned here. In order to allow a measurement method which is as rapid as possible, the excitation pulse is limited to precisely one oscillation comprising a positive and a negative half-wave, which follow one another directly.

Figure 2:
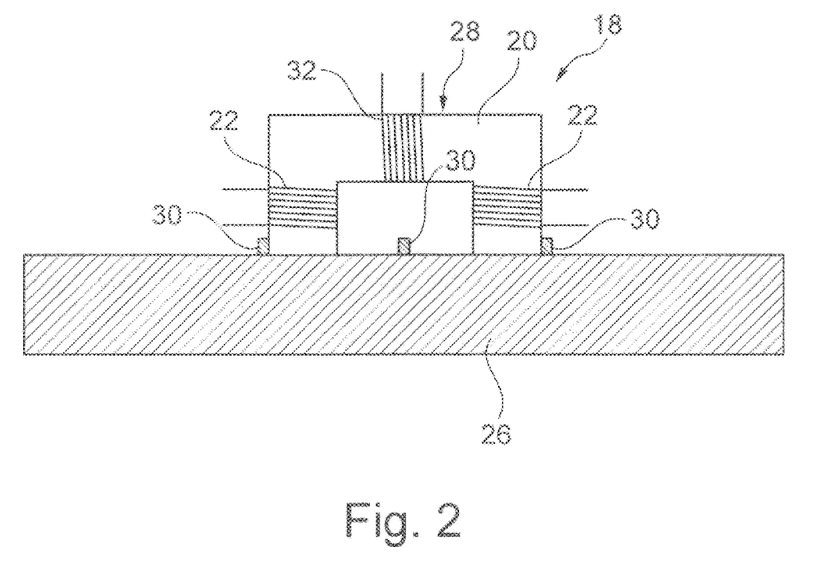
FIG. 2 shows a micromagnetic sensor arrangement according to the invention for carrying out the method.

FIG. 2 shows a sensor arrangement 18 for carrying out the method. The sensor arrangement 18 comprises a magnet yoke 20 and two excitation coils 22 connected in parallel, which are wound around the limbs of the magnet yoke 20 at the respective ends. The sensor arrangement 20 furthermore comprises receivers. One of these receivers is formed by a reception coil 32 on the yoke crosspiece 28 of the magnet yoke 20. The magnet yoke 20 in this case forms the magnetic cores of the excitation coil 22 and of the reception coil 32. Sensor arrangements 18 having only one excitation coil 22 and a reception coil 32 may also be envisioned. In that case, the reception coil 32 is typically also arranged on a limb of the magnet yoke 20 instead of on the yoke crosspiece 28. Such a sensor arrangement 18 is simpler to produce since the coils 22, 32 can be wound independently of the magnet yoke 20 and subsequently pushed onto the limbs of the magnet yoke 20. Currents and/or voltages are induced in the reception coil 32 by a time-varying magnetic field of a magnetic circuit consisting of the magnet yoke 20 and the body 26. These form a signal, which can be measured. The sensor arrangement 18 of FIG. 2 furthermore comprises Hall elements 30. Two of these Hall elements 30 are respectively arranged on the limbs of the magnet yoke 20. By means of this, lifting of the sensor arrangement 18 from the body 26 during a relative movement between the sensor arrangement 18 and the body 26 can be registered and taken into account in the evaluation. A further Hall element 30, which is arranged between the two limbs on the side of the magnet yoke 20 facing toward the body 26, is configured in order to record local variations of the magnetic field of the magnetic circuit consisting of the sensor arrangement 18 and the body 26. Here, it is conceivable to arrange even more Hall elements 30. Not represented is a temperature sensor, which may possibly be necessary in order to correct the signal of the Hall elements 30 and to register the temperature during the measurement, which allows the classification of a temperature-dependent material characteristic determined in this way. The signal of a Hall element 30 is temperature-dependent.

Figure 3:
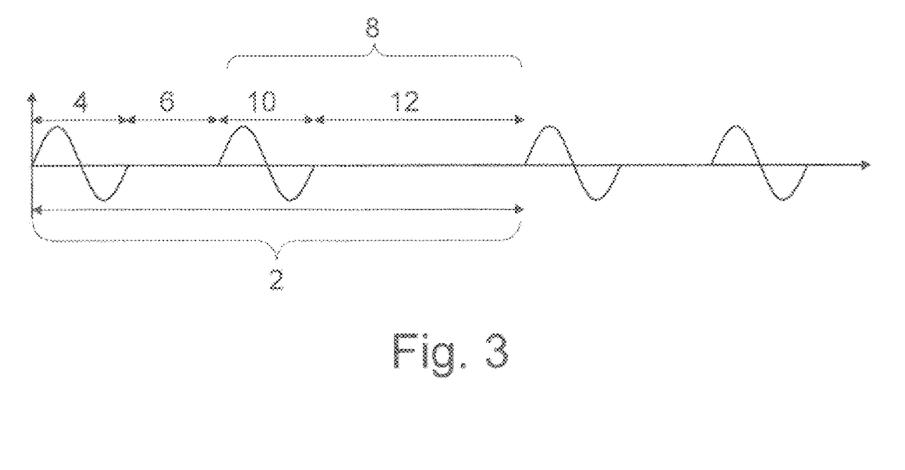
FIG. 3 shows a test sequence of the method according to the invention.

FIG. 3 shows the excitation signal at the excitation coil 22 in the course of time during a test sequence 2. The latter comprises the four phases: magnetizing 4, first dead time 6, measurement sequence 10 and second dead time 12. In the example in FIG. 3, excitation is carried out via a sinusoidal signal having two half-waves, the magnetizing, the first dead time and the measurement sequence having a time duration which corresponds to precisely one oscillation of the excitation signal. The second dead time 12 is selected to be longer than this.

Figure 4:
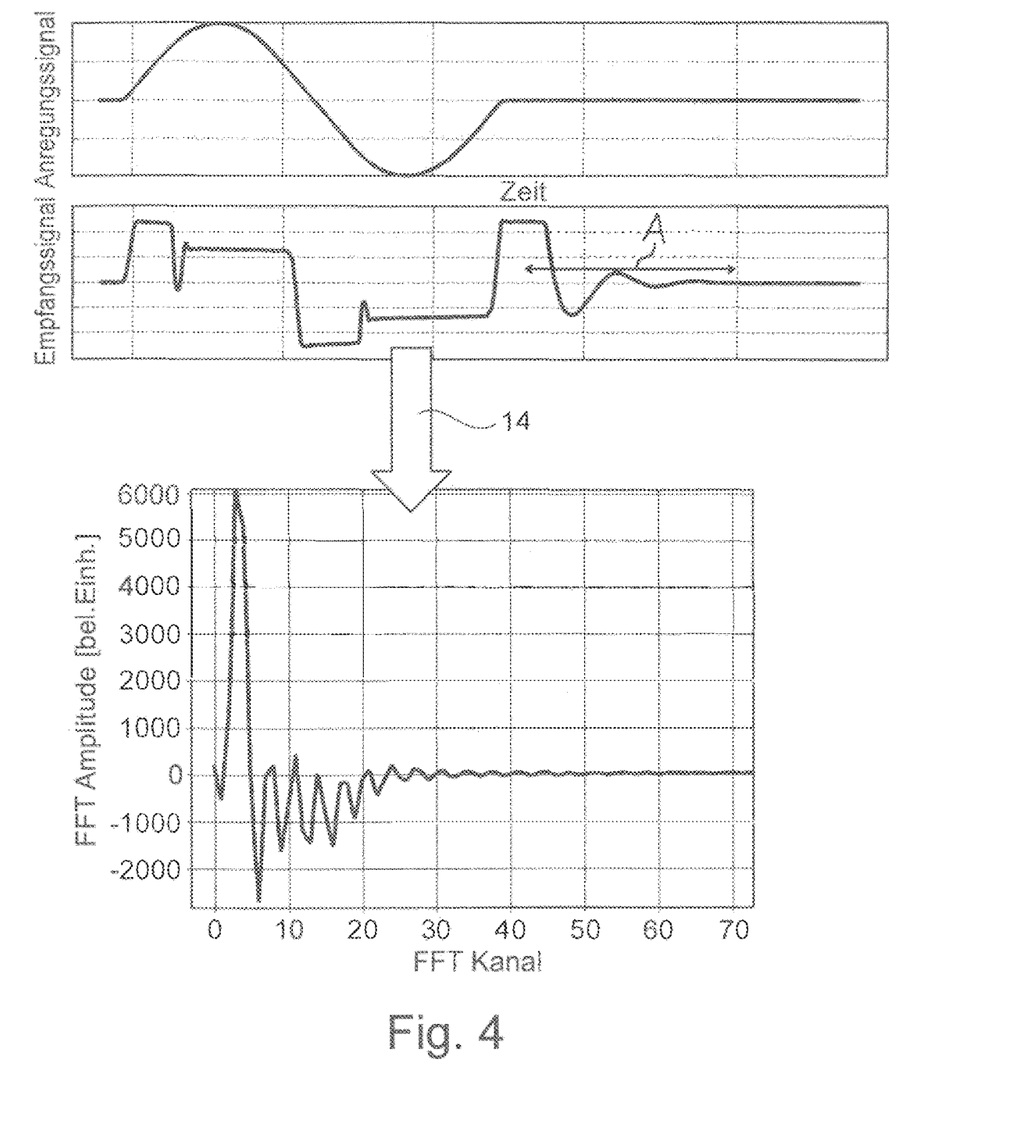
FIG. 4 shows an excitation signal, the signal resulting therefrom, and the Fourier transform of the signal.

FIG. 4 shows the excitation signal as a function of time in the upper image and underneath, likewise as a function of time, the signal in the receiver which is measured during the measurement cycle 8. The excitation in the measurement sequence 10 via a sinusoidal oscillation having a positive and a negative half-wave and a sign change may be seen. The signal shows on the one hand the profile during the measurement sequence 10 as well as the post-oscillation A in the second dead time 12. This signal is subjected to a Fourier transformation 14, from which individual Fourier components are obtained (lower figure with the FFT amplitude in arbitrary units as a function of the FFT channel). These Fourier components have a correlation with the desired material characteristic. For quantitative determination of the material characteristic, calibration of the measurement method is necessary with the aid of test bodies having known material characteristics, on which the method according to the invention is carried out. In this case, one or more Fourier components are set in relation to the material characteristic. This relation may be simple if a Fourier component turns out to be directly proportional to the desired material characteristic or the material characteristic can be determined via simple relationships from one or a few Fourier components. The relation may, however, prove to be very complex. In such a case, the correlation may, for example, be carried out by machine learning methods such as the random forest method or a support vector machine.

Figure 5:
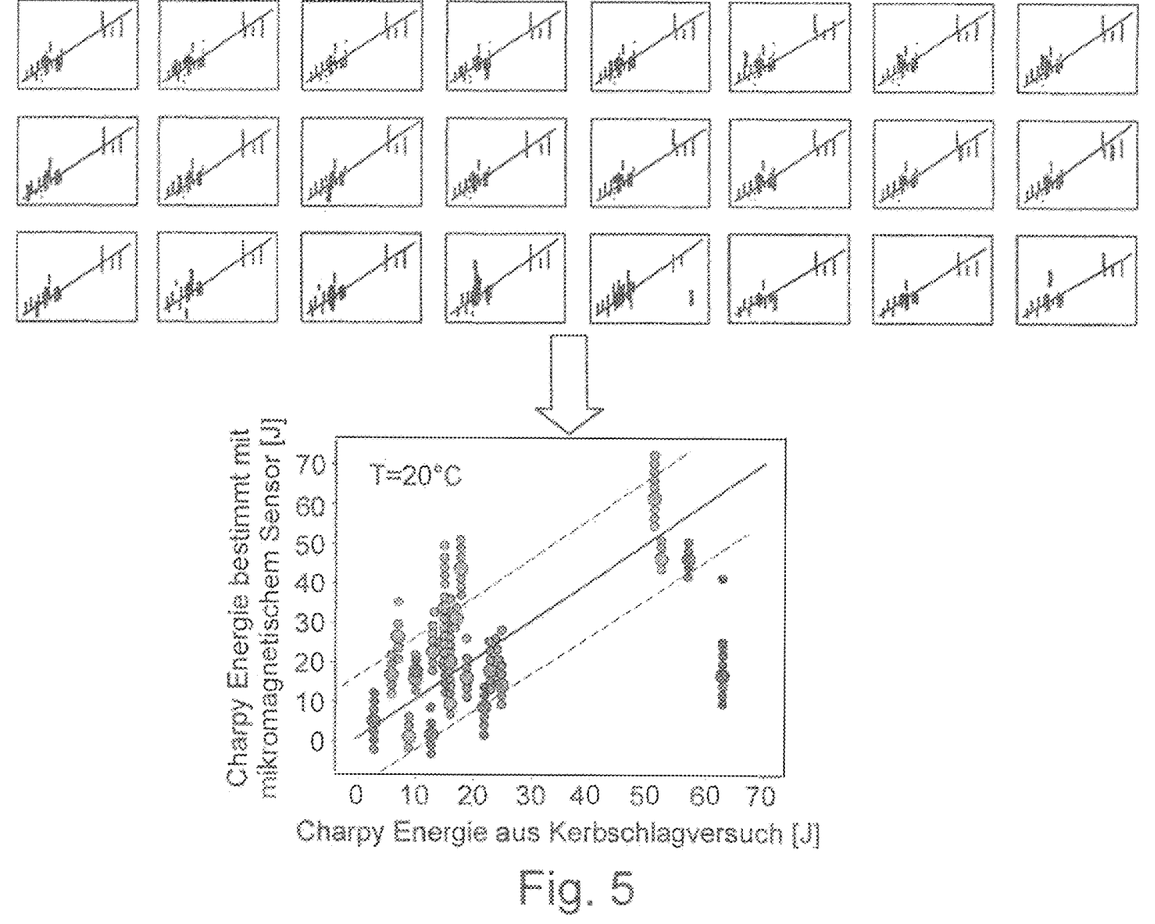
FIG. 5 the result of the determination of the Charpy toughness by means of the method according to the invention.

FIG. 5 shows the use of the method according to the invention for determining the Charpy toughness of pipeline pipes. For this purpose, separated segments of old pipeline pipes were examined. From each segment, specimen pieces were taken and the Charpy toughness was determined on them by means of a V-notch impact test at room temperature. The measurement according to the invention was carried out on the specimens according to the method according to the invention. In this case, 30 complex Fourier components were determined, and were correlated by means of machine learning according to the random forest method with the experimentally determined Charpy toughnesses of the specimens. The training was carried out according to the N−1 method, in which 23 specimens were used for the training and the calibration obtained in this way was tested on the 24$^{th}$ specimen. The method delivers a usable correlation of the measurement results calibrated by means of the machine learning method with the Charpy toughnesses determined by the V-notch test.

Figure 6:
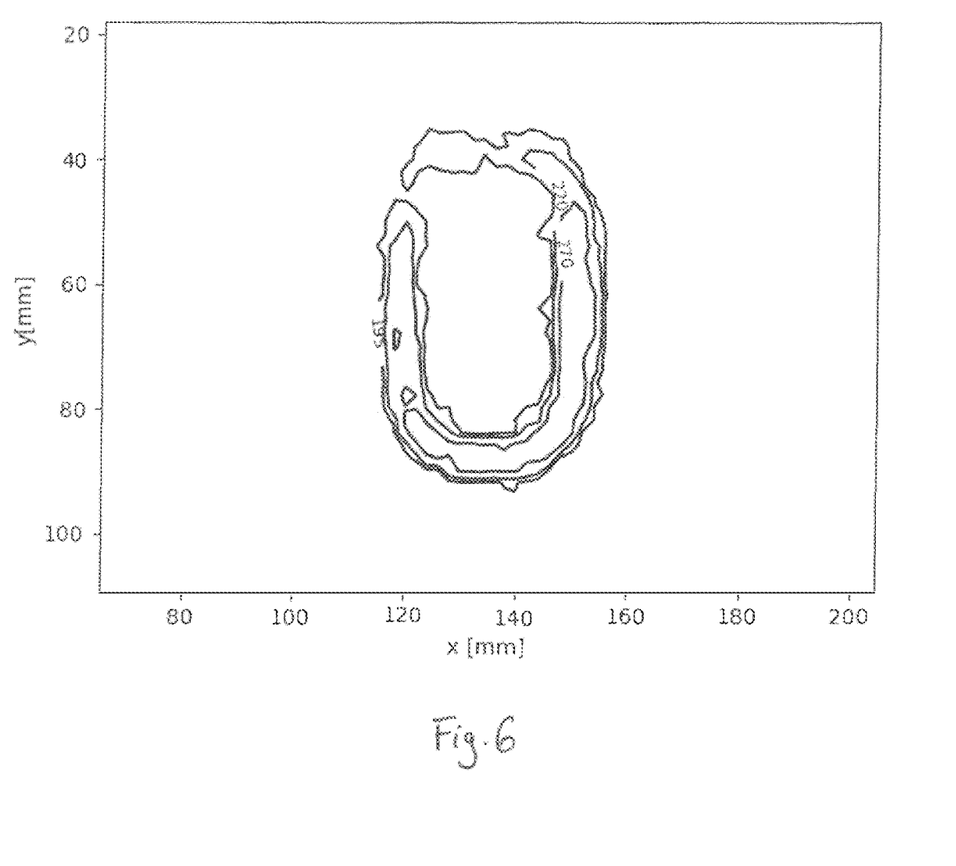
FIG. 6 shows the result of a measurement of a local hardness evaluation with a mobile hardness measuring instrument.
Figure 7:
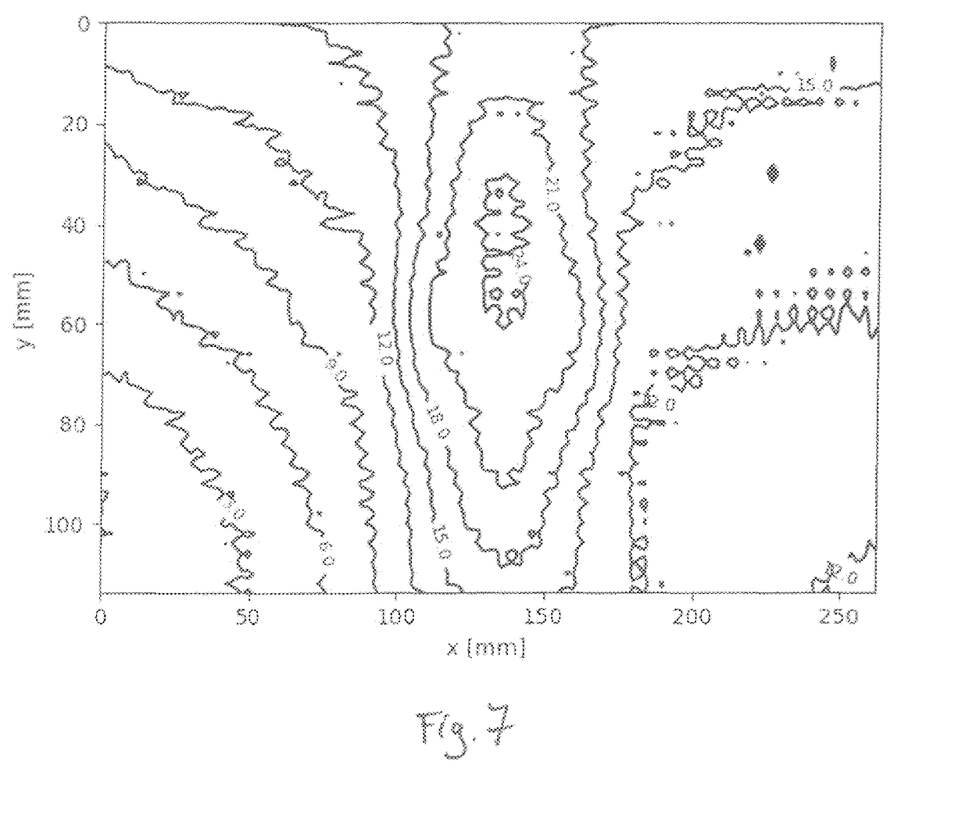
FIG. 7 the result of a measurement with the micromagnetic method according to the invention by using the reception coil arranged on the yoke crosspiece as the receiver.
Figure 8:
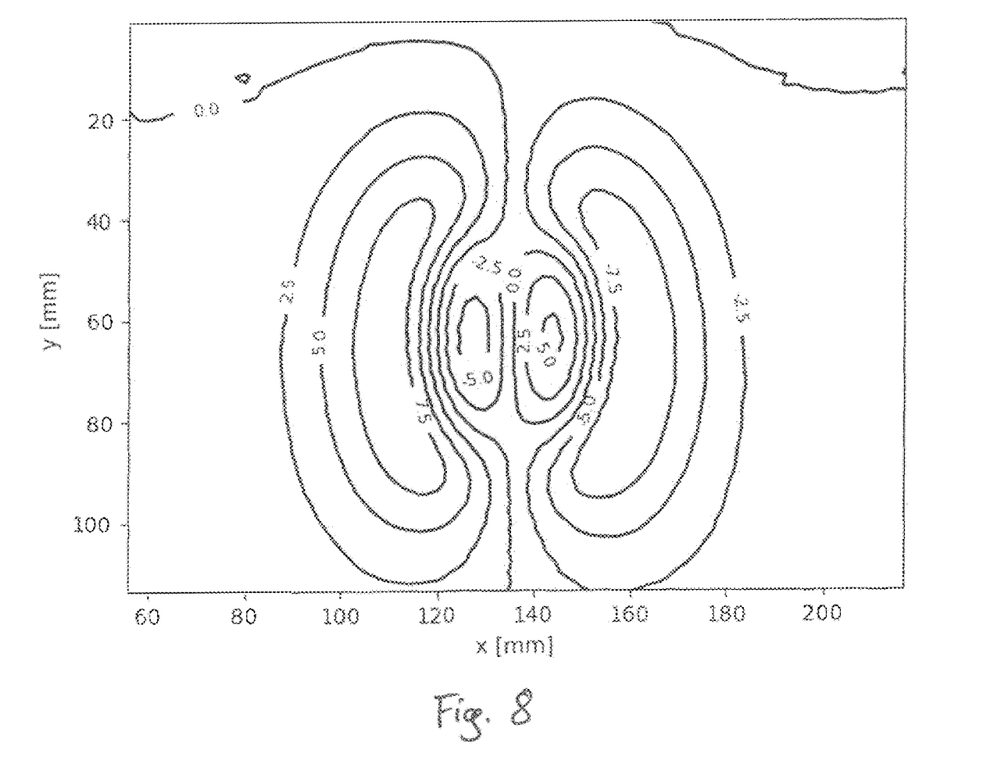
FIG. 8 shows the result of a measurement by the method according to the invention by using the Hall element in the middle of the yoke as the receiver.

FIGS. 6, 7 and 8 show the results of the use of the method according to the invention for measuring material inhomogeneities with reference to the example of local hardness increases. For this purpose, a local hardness increase was produced on a test body by means of induction hardening. With a horseshoe-shaped inductor, the body was locally brought to incandescence and quenched with water. FIG. 6 shows the results of a hardness measurement with a mobile hardness measurement method according to the ultrasound contact impedance method. The measurement is carried out in a measurement grid of 2×2 mm. FIG. 7 shows the result of a measurement by the method according to the invention with the sensor arrangement 18, this result having been determined on the basis of the signal measured at the reception coil 32 arranged on the yoke crosspiece 28. The hardness increase can be detected by means of the method according to the invention, the resolution not being sharp because of the large area of action of the sensor arrangement 18. FIG. 8 shows the result when Hall elements 30 arranged in the middle of the magnet yoke 20, which can detect the local stray fields of the magnetic field, are used to evaluate the signal. In this way, the oval shape of the hardness increase can also be resolved by means of the method according to the invention.

Figure 9:
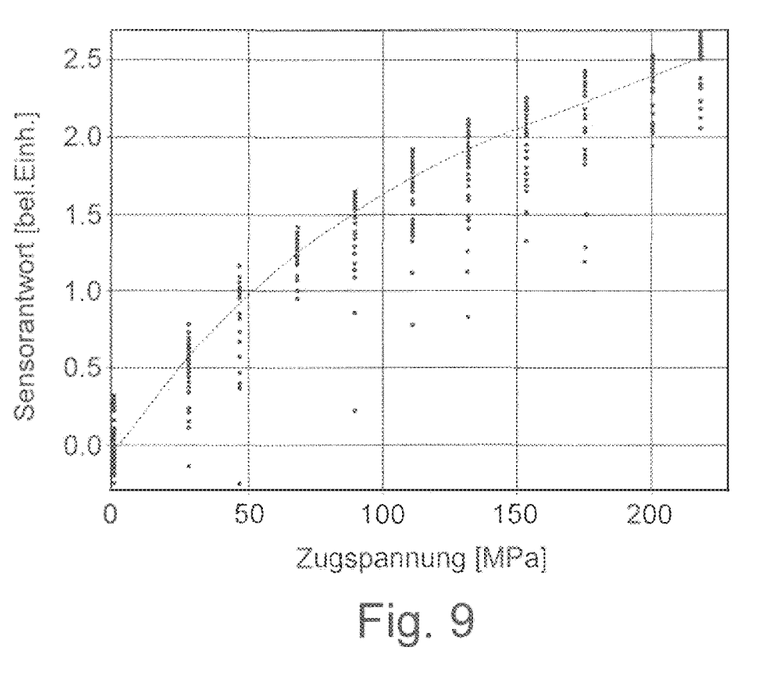
FIG. 9 shows a correlation between a Fourier component obtained by the method according to the invention and the tensile strength in a body being examined.

FIG. 9 shows the use of the method according to the invention for measuring material stresses with reference to the example of tensile stresses. For this purpose, a tensile test was carried out, in which the tensile stress in the test body was determined by means of a sensor fastened on the body. At the same time, measurements were carried out by means of the method according to the invention during the tensile test. From the Fourier transform of the resulting signal, an individual Fourier component which showed a good correlation with the tensile stress could be determined. Tensile stresses may therefore also be determined by means of the method according to the invention.

Figure 10:
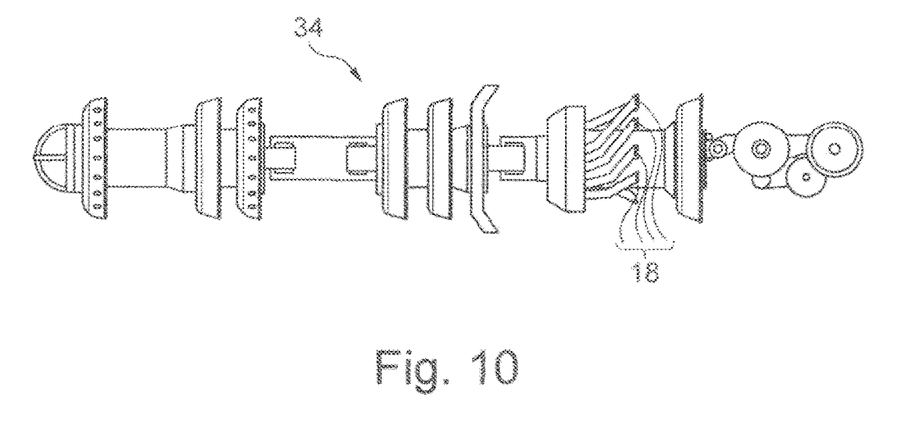
FIG. 10 shows an inspection pig for the in-line inspection of pipelines having the sensor arrangement according to the invention.

FIG. 10 shows an in-line inspection pig 34 for the in-line inspection of pipelines, which is provided with corresponding sensor arrangements 18. The pig 34 represented comprises eight sensor arrangements distributed over the circumference. Possibly, four or six sensor arrangements 18 arranged over the circumference may also be enough to obtain a sufficient description of the state of the pipeline material, since in order to determine the toughness, it is currently conventional to take specimens from a pipeline segment only at certain positions distributed over the circumference of the pipeline, these then being subjected to a V-notch test. Nevertheless, inspection pigs 34 which carry out full coverage of the internal surface of a pipeline may also be envisioned. For such full coverage, sensor arrangements are arranged in a plurality of measurement planes arranged behind one another in the axial direction, sensor arrangements in the individual measurement planes being offset with respect to one another in the circumferential direction in such a way that gaps existing between the sensor arrangements of one measurement plane are covered by sensor arrangements of other measurement planes. With such an inspection pig 34, for example, material inhomogeneities may be registered or a longitudinal seam of the pipeline may be examined.

The invention claimed is:

1. A method for determining at least one material characteristic of a magnetizable metal body by a micromagnetic sensor arrangement, the sensor arrangement comprising at least one excitation coil having a magnetic core for signal excitation and at least one receiver, the method comprising the following steps:

magnetizing the body with a current or a voltage excitation via the sensor arrangement, the excitation comprising at least one sign change between a positive part of a half-wave and a negative part of a half-wave, wherein a frequency of the excitation is at least 500 Hz,     measuring at least one signal in the receiver during the excitation,     Fourier transforming the at least one signal,     determining the material characteristic from at least one Fourier component,     turning off the excitation, after turning off the excitation, measuring a post-oscillation of the at least one signal in the receiver, and using at least a part of the at least one signal resulting from the post-oscillation in Fourier transforming the at least one signal.

2. The method as claimed in claim 1, wherein pulsed excitation is carried out.

3. The method as claimed in claim 2, wherein the excitation is carried out by precisely one oscillation comprising a positive and a negative half-wave, which follow one another directly.

4. The method as claimed in claim 2 further comprising the following steps in the order mentioned:

magnetizing the body by a first excitation pulse, turning off the excitation during a first dead time, exciting the body by a second excitation pulse in a measurement sequence, turning off the excitation during a second dead time, a measurement of the induction signal being carried out in the measurement sequence and in the second dead time.

5. The method as claimed in claim 1, wherein the excitation is carried out with a magnetization frequency of between 500 and 5000 Hz.

6. The method as claimed in claim 1, wherein the measurement of the signal is carried out by a reception coil having a magnetic core as the receiver.

7. The method as claimed in claim 1, wherein the measurement of the signal is carried out by a magnetic field sensor as the receiver.

8. The method as claimed in claim 1, wherein a correlation of the at least one material characteristic with at least one Fourier component is carried out with the aid of test bodies, the Fourier components of which have been measured by a method of claim 1 and wherein the material characteristics of which are known and/or have been determined by other measurement methods before or after determining the Fourier components.

9. The method as claimed in claim 8, wherein the determination of the correlation is carried out by a machine learning method.

10. The method as claimed in claim 9, wherein the determination of the correlation is carried out according to a random forest method or by means of a support vector machine (SVM).

11. The method as claimed in claim 1, wherein a mechanical-technological material characteristic is determined.

12. A micromagnetic sensor arrangement for carrying out the method of claim 1, the sensor arrangement comprising an excitation coil having a magnetic core for signal excitation and at least one receiver, wherein the magnetic core is made from a nanocrystalline material having a high magnetic permeability.

13. The sensor arrangement as claimed in claim 12, wherein the receiver is formed by a reception coil having a magnetic core.

14. The sensor arrangement as claimed in claim 12, wherein the receiver is formed by a magnetic field sensor.

15. The sensor arrangement as claimed in claim 12, further including a temperature sensor.

16. The sensor arrangement as claimed in claim 12, wherein the sensor arrangement has a length of between 5 and 10 cm.

17. An inspection pig for an in-line inspection of pipelines, the inspection pig comprising the sensor arrangement as claimed in claim 12.

18. The inspection pig as claimed in claim 17, further including 4 to 8 sensor arrangements distributed over a circumference of the inspection pig.

19. The method as claimed in claim 1, wherein magnetizing the body with the excitation causes a reversal of magnetization in the body.

* * * * *